(12) United States Patent
Khandani

(10) Patent No.: US 7,817,641 B1
(45) Date of Patent: Oct. 19, 2010

(54) METHODS FOR SPATIAL MULTIPLEXING OF WIRELESS TWO-WAY CHANNELS

(75) Inventor: Amir Keyvan Khandani, University of Waterloo, E&CE Department, 200 University Ave. West, Waterloo, Ontario (CA) N2L 3G1

(73) Assignee: Amir Keyvan Khandani, Kitchener, Ontario (CA)

( * ) Notice: Subject to any disclaimer, the term of this patent is extended or adjusted under 35 U.S.C. 154(b) by 740 days.

(21) Appl. No.: 11/581,427

(22) Filed: Oct. 17, 2006

Related U.S. Application Data

(60) Provisional application No. 60/728,307, filed on Oct. 20, 2005.

(51) Int. Cl.
*H04L 12/28* (2006.01)
*H04L 12/56* (2006.01)

(52) U.S. Cl. .................................. 370/395.4
(58) Field of Classification Search .............. None
See application file for complete search history.

(56) References Cited

U.S. PATENT DOCUMENTS

| | | | | |
|---|---|---|---|---|
| 6,965,774 | B1 * | 11/2005 | Kasapi et al. | 455/450 |
| 6,970,682 | B2 * | 11/2005 | Crilly et al. | 455/78 |
| 7,483,711 | B2 * | 1/2009 | Burchfiel | 455/522 |
| 2004/0155819 | A1 * | 8/2004 | Martin et al. | 343/700 MS |
| 2005/0099975 | A1 * | 5/2005 | Catreux et al. | 370/329 |
| 2006/0098683 | A1 * | 5/2006 | Thaler | 370/462 |

OTHER PUBLICATIONS

E. C. Van Der Meulen, "Three-terminal communication channels," Adv. Appl. Prob., vol. 3, pp. 120-154, 1971. (USA).

T. M. Cover and A. El Gamal, "Capacity theorems for the relay channel," IEEE Transactions on Information Theory, vol. IT-25, No. 9, pp. 572-584, Sep. 1979. (USA).

D. M. Pozar, Microwave Engineering. New York: Wiley, 1990.

Tsubouchi, K.; Nakase, H.; Namba, A.; Masu, k., Full duplex transmission operation of a 2.45-GHz asynchronous spread spectrum using a SAW convolver IEEE Transactions on Ultrasonic, Ferroelectrics and Frequency Control, v40 No. 5, Sep. 1993, 478-82 (USA).

Nakase, H.; Namba, A.; Masu, K.; Tsubouchi, K. "Full-duplex asynchronous spread spectrum modem using a SAW convolver for 2.4 GHz wireless LAN" IEICE Transactions on Communications, vE77-B,No. 7 ,Jul. 1994, 868-75 (JAPAN).

Chen, S.; Beach, M.A.; McGeehan, J.P. "Division-free duplex for wireless applications", Electronics Letters, v.34, Issue 2, Jan. 22, 1998, pp. 147-148 (UK).

* cited by examiner

*Primary Examiner*—William Trost, IV
*Assistant Examiner*—Raj Jain
(74) *Attorney, Agent, or Firm*—Gowling LaFleur Henderson LLP

(57) ABSTRACT

Conventional two-way wireless communication nodes require separate channels to receive or transmit. The two channels are usually multiplexed in time and/or frequency. A system which can support both links (transmit and receive) at the same time is referenced as a as a full duplex system. Systems and methods are described to create the two links simultaneously, overlapping in frequency and in time domains, while avoiding the hardware complexity and/or lack of flexibility inherent to conventional systems, by reducing the amount of self interference between transmitter and receiver sections. The self interference may be reduced by using at least one of antenna design techniques comprising antenna selection and signal processing techniques to maximize the signal-to-interference plus noise ratio.

8 Claims, 3 Drawing Sheets

METHODS FOR SPATIAL MULTIPLEXING OF WIRELESS TWO-WAY CHANNELS

PRIORITY

This application claims benefits of my previous provisional application 60/728,307. This document includes the missing part related to the application Ser. No. 11/581,427, confirmation number 7471.

FIELD OF THE INVENTION

The present invention relates generally to wireless communications. More particularly, the present invention relates to antenna design, and/or methods for combined interference cancellation-channel decoding/demodulation (demapping), to establish full duplex (two-way) communications, while offering lower complexity and/or improved performance as compared to the current methods for full duplex wireless communications.

BACKGROUND OF THE INVENTION

In many wireless systems, communication nodes should be able to talk and to listen. This is needed in point-to-point communications connecting node A to node B, wherein the two nodes should be able to transmit information in both directions, namely from A to B and form B to A (see FIG. 1). One may be also interested to connect node A to node B (A talks and B listens) and node B to node C (B talks and C listens). It is desirable that such nodes can simultaneously talk and listen. An example is the telephone line which is composed of a single pair of wire, however, it can establish a two way connection and both parties involved in a conversation can simultaneously talk to each other and listen to each other. The operation of changing the direction of information flow in a communication link is called duplexing. A communication link with the capability to support the connection in both directions at the same time is called a full duplex, or a two-way system. In contrast, a link that can support the connection in only one direction at a time is called half duplex. It is important to realize that in many applications for point-to-point communication, the traffic is mostly in one direction (say from A to B) and the opposite link (from B to A) is used to communicate control information, for example ACK/NAK in an ARQ scheme or channel state information in adaptive transmission. This means it is important to establish the opposite link, even if it may have a small capacity. There are two methods commonly used for duplexing:

Time Division Duplex (TDD): This is indeed equivalent to half duplexing where the direction of the information flow can be changed in time to be in either from A to B or from B to A, but not in both directions at the same time. More generally, this corresponds to a system in which a given node can either talk or listen (can not talk and listen at the same time). TDD systems inherently suffer from high control overhead which is required to switch the connection from one direction to the other (this reduces the efficiency and increases the network complexity). TDD systems also suffer from an inherent delay in changing the direction of information flow which is problematic in some applications.

Frequency Division Duplex: This is equivalent to full duplexing, however, the two links use two different frequency bands. FDD systems are more complex due to using two units (transmitter and receiver units) operating in two different frequency bands. FDD systems are also less flexible in scenarios that the amount of traffic in one direction may be higher than the other (the allocated bandwidth determines the relative capacity of the two directions which is fixed depending on the hardware of the system and cannot be changed in response to changes in relative traffic loads in the two directions). To reduce hardware complexity, the bandwidth allocated to the two links are usually set equal to each other, which contradicts the fact that the traffic is usually higher in one direction in data centric applications (for example, in down-load of information in internet access the traffic is mostly from the access point to the mobile unit).

Disadvantages of the FDD,TDD Technologies: In summary, FDD systems inherently suffer from lack of flexibility and excessive hardware complexity, while TDD systems suffer from excessive control overhead and delay in switching the direction of information flow. It is desirable to have full-duplex systems with low hardware complexity and high flexibility.

Prior Relevant Works: It is widely known that one can improve the system capacity (as compared to TDD and FDD) by using a full duplex system wherein the two links overlap in both time and frequency [1][2]. The theory and the possibility of designing such a two-way radio system has been known for many years [3], however, bridging the gap between theory and practice in this area has been very challenging. There have been some prior works aiming to come up with a practical design, for example [4][5][6], however with limited success. One of the main differences between this invention and all these earlier works is that in our case the antennas are designed and/or activated (selected among the several available choices) to reduce the amount of the self interference: In one embodiment of this invention, the transmit antenna structure is designed to create static (designed in hardware and fixed) and/or dynamic (through beam-forming) null at the physical location of its corresponding receiver antenna. Alternatively, in another embodiment of this invention, the receive antenna structure is designed to create static (designed in hardware and fixed) and/or dynamic (though beam-forming) null at the physical location of its corresponding transmit antenna. In some embodiments of this invention, some specific designs to create such antenna structures based on patch antennas are given.

SUMMARY OF THE INVENTION

Duplexing is a key ingredient of any two-way wireless system. Current systems rely on either Time Division (TD) or Frequency Division (FD) for duplexing which results in poor spectral efficiency, high complexity, lack of flexibility, and difficulty in relaying. This invention solves some of these shortcomings through the introduction of a low complexity Space Division Duplexing system wherein two way communications is established through novel antenna designs and signal processing. The established links may be separated in time and/or in frequency or may partially overlap in time and/or in frequency. The established links may provide a two-way communication between transceivers $TR_1$ and $TR_2$ shown as $TR_1 \leftrightarrow TR_2$ (sign $\leftrightarrow$ specifies information flow in both directions), or between transceivers TR1, $TR_2$ and TR3 as $TR_1 \Rightarrow TR_2 \Rightarrow TR3$ (sign LH$\Rightarrow$RH specifies information flow from the LH to the RH). The case of $TR_1 \Rightarrow TR_2 \Rightarrow TR_3$ may specify a relaying operation. Multi-input multi-output (MIMO) antenna systems are used for their ability to exploit the spatial multiplexing to create multiple pipes of data that overlap in both time and frequency. However, such MIMO systems need rich scattering environments to operate properly. A full duplex system of the form claimed in this invention can be also considered as a MIMO system that can create parallel pipes of data flowing in opposite directions in scenarios that the scattering environment in not rich (line of sight propagation).

DETAILED DESCRIPTION

This invention is now described, by way of examples of its preferred embodiments.

This invention introduces a low complexity method for spatial duplexing where special antenna structures and signal processing algorithms work together to provide a full duplex wireless channel (the flow of information can simultaneously occur in both directions). This invention results in increasing the bandwidth efficiency, its hardware complexity is significantly less than FDD, its network control overhead and network management complexity is comparable to FDD and significantly less than TDD, and there is no delay or other overheads in switching the direction of information flow as is inherent to TDD systems.

In a preferred embodiment of this invention, the two links are further separated through using different spreading codes and/or through using different tones of an OFDM scheme. In a preferred embodiment of this invention, one of the two inks has a lower rate and supports control signals, including ACK/NAK, or sends back the channel state information. Note that establishing such feedback links in scenarios that multiple units share the wireless media and communicate with a given access point is challenging and could result in major overhead in network control, and consequently, drop the network efficiency/throughput. One central idea behind this invention is to keep the rate of this feedback link low, and further isolate it from the main forward link through spreading and/or orthogonal modulation (for example using different tones of an OFDM scheme). This means one of the main benefits of the invented full duplex wireless transceiver relies on the fact that the feedback link is active simultaneously with the forward link which indirectly increases the throughout in the forward link due to the presence of up-to-date channel sate information, and/or easier access to control information required for ARQ, and/or the control information required for other network management operations. The feasibility of the invented algorithms and hardware are verified with through computer simulations.

Figure 1:
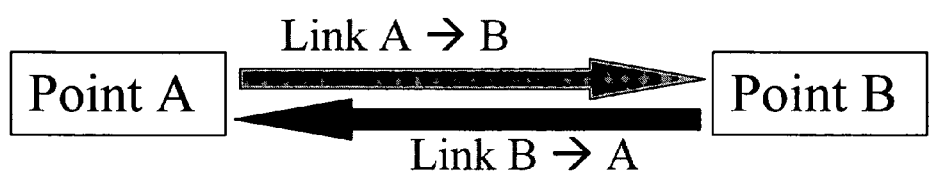
FIG. 1 is the block diagram of a two-way wireless link connecting point A to point B (the two links are: link A→B and link B→A).
Figure 2:
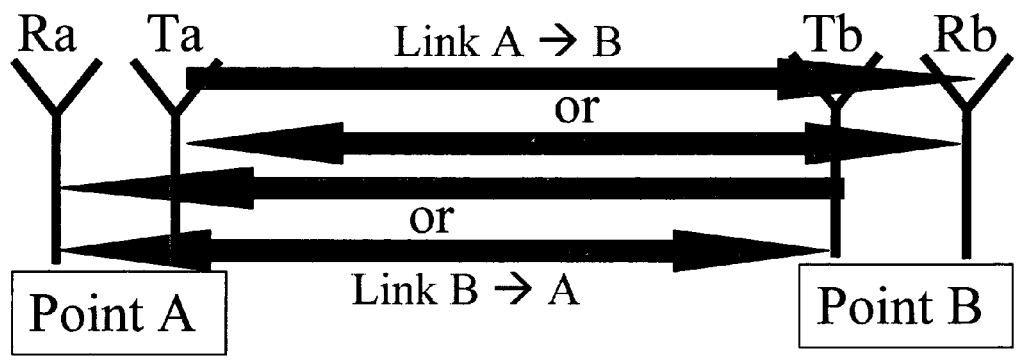
FIG. 2 is the block diagram for an embodiment of the invention where each of the points A and B may have the same or separate antennas for transmit and receive operations, and may decide to operate in the full duplex, or in the half-duplex (TDD) modes.

An embodiment of the invention (see FIG. 2) is a transceiver system, possibly with multiple transmit and/or multiple receive antennas, capable of operating in one of the following two modes of operation: (1) A Turbo mode supporting full duplex communication (simultaneous transmit and receive), and (2) A normal mode supporting half duplex communication (time division duplex, or TDD). The above transceiver can rely on: (1) using the same antenna for the transmit and receive, or preferably, (2) using different antennas for the transmit and receive. The transceiver can select its overall configuration among the various combinations of the above possibilities to maximize certain measure of goodness. This selection can change in different time slots, and/or in different frequency bands. The decision between various possibilities could be based on the factors available at the transceiver, and/or factors fed back from the rest of the network to the transceiver. In a preferred embodiment of this invention, the multiple transmit and/or multiple receive antennas are designed and/or controlled (static beam-forming and/or dynamic beam-forming and/or antenna selection) to have radiation patterns with spectral nulls in certain directions to help in reducing the amount of self interference, or more generally, maximize the signal-to-interference plus noise ratio. The phase shifts required could be static (based on fixed hardware design), or dynamic and could be applied at the RF, and/or at the IF, and/or at the base-band. A preferred embodiment relies on micro-strips to create relative phase shifts between two transmit antennas, or between two receive antennas. The static phase shifts are designed such that the pattern of the transmit antenna(s) or receive antennas(s) have spectral nulls in the direction of one another to reduce the amount of self interference, or more generally, maximize the signal-to-interference plus noise ratio. Note that the physical location and/or orientation, and/or shape of the transmit and/or receive antenna(s) can help in reducing the amount of self interference.

Although in this invention, multiple antennas are used primarily to reduce the amount of self interference, by using a combination of such antenna structures, it would be possible to simultaneously address some of the other common objective(s) in using multiple antenna structures. Examples for such objectives include adaptive beam forming, space-time coding, spatial multiplexing in down-link and/or in uplink, etc.

An embodiment of this invention is composed of a transceiver with the two links operating in the same time slot, without being isolated through hardware filters in the frequency domain (as would be the case in and FDD system). This creates a full duplex system without the need for the complex hardware mechanisms followed in FDD systems. In this invention, the two links are isolated in the spatial domain (antenna design, static/dynamic beamforming, antenna selection), and/or frequency domain (using separate tones of an OFDM system), or code domain (different spreading codes or hoping sequences). The isolation is enhanced by relying on interference cancellation including methods based on combined demodulation, channel decoding and interference cancellation possibly using an iterative decoding/demapping procedure based on mean square error, and/or maximum likelihood, and preferably by working on a block of data to exploit non-causality to improve the performance of the interference cancellation.

An embodiment of the invention is composed of at least two transceivers operating in two different frequency bands, and/or using two different time slots, and/or using two different spreading codes, and/or using two different frequency hopping sequence and working together (managed by a control unit) to create a full duplex system; while each of the two transceivers is operating in a TDD mode. A preferred embodiment is the case of computers with built-in IEEE802.11a WLAN and Bluetooth (or ZigBee) units, each operating in TDD mode, while using their respective IEEE802.11a and Bluetooth (or ZigBee) units simultaneously to provide a full duplex link with an access points, or with other computers, equipped with both IEEE802.11 and Bluetooth. In this case, an access point or computer that is already configured to support full duplex following this invention can itself configure an ordinary computer through loading of the appropriate software and divers with the assistance of the user to enable the computer to communicate in full duplex mode using its Bluetooth and IEEE802.11a transceivers as supported by this invention.

In an embodiment of this invention, the antenna phase shifts are static (designed in hardware) and are set such that the pattern of the transmit antenna(s) or receive antennas(s) have spectral nulls in the direction of one another to reduce the amount of self interference, or more generally, maximize the signal-to-interference plus noise ratio.

Figure 3:
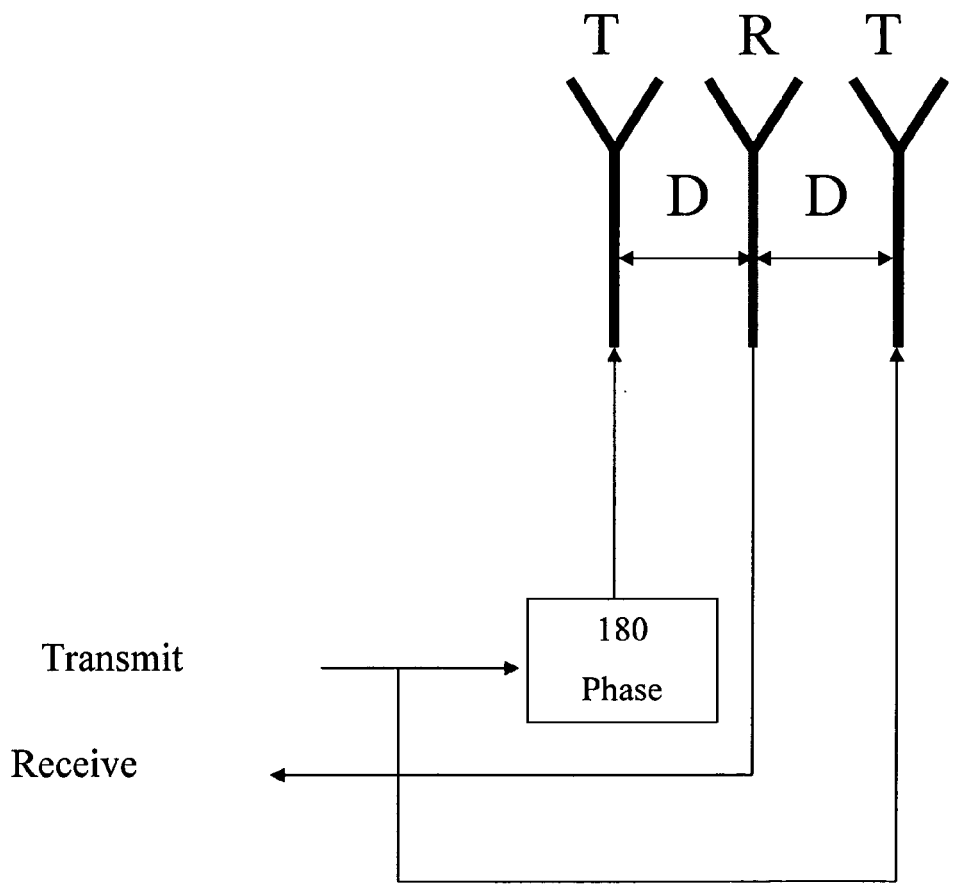
FIG. 3 is the block diagram for a preferred embodiment of the invention based on using two transmit patch antennas with a phase shift of 180 degrees located at equal distance on the two sides of a given receive patch antenna.

A preferred embodiment (see FIG. 3) is the case that each transmit antenna is split into two antennas each with 180 degree phase shift and a receive antenna is physically located in the middle of the two transmit antennas. The 180 degree phase shift is preferably obtained by using micro strip lines designed with proper physical shape and physical dimensions. It is also possible to use other means, say a balanced modulator, capacitance circuits based on reverse biased diodes, or a combination of the above to create the 180 phase shifts. Alternatively, another preferred embodiment is the case that each receive antenna is split into two antennas each with 180 degree phase shift and a transmit antenna is physically located in the middle of the two receive antennas. Again, the 180 degree phase shift is preferably obtained by using micro strip lines designed with proper physical shape and physical dimensions, while it is also possible to use other means, say a balanced demodulator, capacitance circuits based on reverse biased diodes, or a combination of the above to create the 180 phase shifts. In both the above embodiments, it is crucial to isolate the transmit and the receive sections to reduce the amount of self interference. In a preferred embodiment, this is achieved by using patch transmit and receive antenna(s) which are placed on the same surface of a multi-layer printed circuit board where the feed network(s) for the transmitter and/or for the receiver antenna(s) are placed partially on the same surface, partially on middle layer(s), and partially on the other surface of the PC board to help in reducing the amount of self interference. To further reduce the self interference, grounded plane(s) of conducting material are sandwiched between layers of dielectric wherein holes run through the conducting plate across different layers of the PCB to run the feed network across the board. Layers of dielectric are selected of appropriate thickness and material. To further reduce the self interference, band gap material is used in the PCBs. To further reduce the self interference, the corresponding circuitry could be distributed among the two surfaces and the middle layer(s). In another preferred embodiment, a plurality of such patch transceiver antennas with different orientations are fabricated using one or more PCB(s) where a subset of these antennas is activated depending on the time slot and/or frequency band in order to maximize the signal-to-interference plus noise ratio. The interference can be a combination of self interference and interference from external sources. These PCBs can be mounted on a wall, or installed inside a wall. In another embodiment, such PCBs are connected back to back to provide coverage in both directions.

In a preferred embodiment of the invention, two patch transmit antennas with 180 degrees phase shift (preferably created through strip lines) are located on one surface of a PCB, and one receive patch antenna is located on the same surface in the middle of the two transmit antennas (at the physical location of a transmit null), and the transmit feed network is placed on the opposite surface, or on a different layer of the PCB, and the top and bottom PCB surfaces are isolated through a plate of conductor with proper holes to allow the required connections to run across different layers of the PCB, and the electronic circuitry for the receive antenna including LNAs is located on the top surface in the middle of the transmit antennas, and the circuitry for the transmit antennas including Power Amplifiers is located on the bottom surface, and wherein the metal plate is sandwiched between layers of dielectric with appropriate thickness, and the PCB is made of band gap material. In another embodiment, two such PC boards are connected back to back to provide coverage on both sides.

In another preferred embodiment of the invention, two patch receive antennas with 180 degrees phase shift preferably created through strip lines are located on one surface of the PCB, and one transmit patch antenna is located on the same surface in the middle of the receive antennas (at the physical location of a receive null), and the transmit feed is placed on the opposite surface, or on a different layer of the PCB, and the top and the bottom surfaces of PCB are isolated through a plate of conductor with proper holes to allow the required connections to run across different PCB layers, and the electronic circuitry for the receive antenna including LNAs is located on the top surface in the middle of the receive antennas and the circuitry for the transmit antennas, including Power Amplifiers, is located on the bottom surface, and the metal plate is sandwiched between layers of dielectric with appropriate thickness, and possibility made of band gap structure. In another embodiment, two such PCBs are connected back to back to provide coverage on both sides.

In another embodiment of this invention, several full duplex transceiver antennas (where each such transceiver antenna is designed following the specifications of this invention explained above) are employed (on one or several PCBs) and a subset of these is selected depending on the circumstances to optimize the performance. In another embodiment, there are several such PCBs which are placed with certain angles with respect to each other where the angles can be automatically or manually adjusted to optimize the performance. It is also possible to use surrounding walls made of proper material to either reflect or absorb the wave, and thereby enhance the beam forming and/or reduce the amount of self interference created through reflection from the environment.

Figure 4:
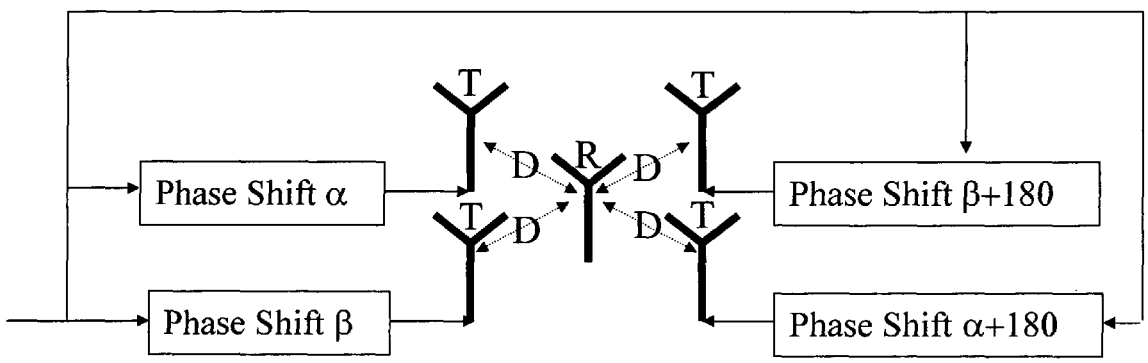
FIG. 4 is the block diagram for an embodiment of the invention based on using 4 transmit antennas. This configuration can be used in any conventional MIMO system, with two transmit antennas with the effective phase shifts of $\alpha$ and $\beta$.

In another embodiment of this invention (see FIG. 4), a plurality of transceivers, each designed following specifications of this invention explained above, are used wherein the complex gain in (amplitude and phase) of different transmit and/or receive antenna(s) are selected based on certain algorithm at the base-band and/or at the IF, and/or at the RF such that in addition to the objective of creating a full duplex transceiver, other objectives for the use of multiple transmit and/or receive antenna systems is fulfilled. Examples of such objectives include: forming space-time code(s), and/or forming smart antenna(s), and/or forming adaptive beam forming antenna(s), and/or multi-user communications including space division multiple access.

In an embodiment of this invention, the established simultaneous links may provide a two-way connection between transceivers $TR_1$ and $TR_2$ shown as $TR_1 \Leftrightarrow TR_2$ (sign $\Leftrightarrow$ specifies information flow in both directions). In another embodiment of this invention, the established simultaneous links provide a $TR_1 \Rightarrow TR_2 \Rightarrow TR_3$ connection (sign LH$\Rightarrow$RH specifies information flow from the LH to the RH), wherein $TR_1 \Rightarrow TR_2 \Rightarrow TR_3$ may specify a relaying operation. There may be also a plurality of such transceivers forming a multi-hop relay, and a plurality of multi-hop relays forming a mesh network.

Another embodiment of this invention deals with multi-hop relay, wherein an OFDM signaling scheme is used and when the total delay introduced by the multi-hop relaying and wave propagation is within the tolerable delay determined by the employed cyclic prefix to guarantee addition of the relayed signals at the intermediate nodes (relays) and at the final destination.

Another embodiment of this invention deals with multi-hop relay, wherein CDMA signaling with rake receiver at the relays and at the final destination is used and when the delay introduced by the multi-hop relaying and wave propagation is such that the RAKE receivers can function in an optimum manner.

Another embodiment of this invention supports channel coding, adaptive transmission, space-time codes, and spatial multiplexing.

Another embodiment of this invention uses adaptive coding and modulation, wherein the modulation and the code rate are selected, among other factors, based on the level of remaining self interference.

The above-described embodiments of the present invention are intended to be examples only. Alterations, modifications and variations may be effected to the particular embodiments by those of skill in the art without departing from the scope of the invention, which is defined solely by the claims appended hereto.

REFERENCES

[1] E. C. van der Meulen, "Three-terminal communication channels," *Adv. Appl. Prob.*, vol. 3, pp. 120-154, 1971.
[2] T. M. Cover and A. El Gamal, "Capacity theorems for the relay channel," *IEEE Trans. Inf. Theory*, vol. IT-25, no. 9, pp. 572-584, September 1979.
[3] D. M. Pozar, Microwave Engineering. New York: Wiley, 1990
[4] Tsubouchi, K.; Nakase, H.; Namba, A.; Masu, K., "Full duplex transmission operation of a 2.45-GHz asynchronous spread spectrum using a SAW convolver," *IEEE Transactions on Ultrasonic, Ferroelectrics and Frequency Control*, v 40, no.5, September 1993, 478-82
[5] Nakase, H.; Namba, A.; Masu, K.; Tsubouchi, K. "Full-duplex asynchronous spread spectrum modem using a SAW convolver for 2.4 GHz wireless LAN" IEICE Transactions on Communications, v E77-B, no. 7, July 1994, 868-75
[6] Chen, S.; Beach, M. A.; McGeehan, J. P. "Division-free duplex for wireless applications", Electronics Letters Volume 34, Issue 2, 22 Jan. 1998, Page(s):147-148

What is claimed is:

1. A transceiver unit, comprising:
   a transmitter,
   a receiver; and
   a plurality of antennas, at least one of the plurality of antennas defining at least one transmit antenna and at least one of the plurality of antennas defining at least one separate receive antenna to enable simultaneous transmitting and receiving, overlapping in time and frequency, for a two-way communication with another communication device, the plurality of antennas configured and/or controlled using at least one of antenna design techniques comprising antenna selection and signal processing techniques to reduce self-interference between the at least one transmit antenna and the at least one separate receive antenna to maximize the signal-to-interference noise ratio, such that an amount of the signal-to-interference noise ratio at the at least one separate receive antenna is measured and maximized through at least one technique selected from:
   antenna design technique, comprising at least one of: shape/dimension, layout, orientation, placement of feed network, antenna selection, and antenna beamforming;
   adaptive signal processing technique comprising interference cancellation, to process a block of data to exploit the non-causality to improve the performance of the interference canceller; and
   adaptive signal processing technique comprising combined demodulation, channel decoding and interference cancellation using an iterative decoding/demapping procedure to process a block of data to exploit non-causality to improve the performance of the interference cancellation; and
   wherein each transmit or receive antenna is split into multiple antennas each with a phase shift selected for reducing the amount of the self-interference;
   wherein the transmit and receive antennas comprise patch antennas placed on a same surface of one or more multilayer printed circuit boards (PCBs) of the unit and wherein the unit further comprises respective feed networks for the transmit and receive antennas placed partially on the same surface as the patch antennas, partially on intermediate layers and partially on the other surface of the PCB for reducing the amount of self-interference;
   wherein said PCB layers are isolated through grounded planes of conducting material to reduce self-interference where such planes have holes to pass the respective feed networks across the layers of the PCB; wherein the layers of the PCB are made of one or more selected dielectric materials having one or more thicknesses for reducing the amount of self-interference; and wherein band gap material is used in the PCBs for reducing the amount of self-interference;
   and further wherein the transceiver unit comprises:
   a. a PCB comprising multiple layers of said dielectric material and band gap material sandwiching grounded planes of conductor material, said PCB defining connections between the layers for the conductor, said PCB comprising opposite top and bottom surfaces;
   b. two patch antennas defining transmit antennas having a 180 degree phase shift difference located on one of the opposite surfaces of the PCB;
   c. one patch antenna defining a receive antenna located on the same one opposite surface of the PCB in the middle of the two transmit antennas at the physical location of a transmit null;
   d. a transmit feed network located on the other of the opposite surfaces of the PCB or on a different layer of the PCB from said patch antennas;
   e. circuitry for the receive antenna, comprising low noise amplifiers (LNAs), located on the same one surface at the physical location of a local transmit null; and
   f. circuitry for the transmit antennas, comprising power amplifiers, located on the other of the opposite surfaces of the PCB.

2. The transceiver unit of claim 1 wherein two such PCBs are connected back to back to provide coverage on both sides.

3. The transceiver unit of claim 1 wherein the roles of the transmit and receive antennas are exchanged.

4. The transceiver unit of claim 1 comprising a plurality of full duplex transceiver antennas each defined in accordance with elements a) to f) and wherein the respective PCBs are located at an angle and orientation with respect to each other for reducing the amount of self-interference and wherein the angles are adjustable to optimize performance.

5. The transceiver unit of claim 1 surrounded by moveable or fixed walls comprising material selected to either absorb or reflect electromagnetic energy to reduce self-inference and/or shape the radiation transmit and/or receive pattern(s) to maximize the signal-to-interference noise ratio.

6. The transceiver unit of claim 1 wherein the transceiver unit is configured for communicating with at least one other similar unit such that a complex gain of the transmit or receive antenna(s) of the transceiver unit is selected to provide a full duplex transceiver and wherein the transceiver unit is further configured in accordance with techniques for the use of multiple antenna systems comprising one of spatial multiplexing or space-time coding.

7. The transceiver unit of claim 6 configured to perform a relaying operation such that simultaneous links between the transceiver unit and two others provide a $TR_1 \Rightarrow TR_2 \Rightarrow TR3$ connection and wherein $LH \Rightarrow RH$ specifies information flow from the LH to the RH.

8. The transceiver unit of claim 7 configured to perform a multi-hop relaying operation among a plurality of others, wherein (1) an OFDM signalling scheme is used and where the total delay introduced by the multi-hop relaying and wave propagation is within the tolerable delay specified by an employed cyclic prefix to guarantee addition of the relayed signals at the intermediate relay nodes and at the final destination, and (2) a CDMA signalling with RAKE receiver at the relay nodes and at the final destination is used and where the delay introduced by the multi-hop relaying and wave propagation is such that the RAKE receivers can function in a desired manner.

* * * * *